United States Patent [19]

Dudash et al.

[11] 4,387,300
[45] Jun. 7, 1983

[54] OPTICAL TRANSDUCER

[75] Inventors: Carl S. Dudash; Kenneth P. Hansen, both of Enfield, Conn.

[73] Assignee: United Technologies Corporation, Hartford, Conn.

[21] Appl. No.: 225,085

[22] Filed: Jan. 14, 1981

[51] Int. Cl.³ .............................................. H01J 3/14
[52] U.S. Cl. ................. 250/239; 250/237 G
[58] Field of Search ............ 250/235 SE, 237 G, 239; 356/395; 340/347 P

[56] References Cited

U.S. PATENT DOCUMENTS

| | | | |
|---|---|---|---|
| 3,046,542 | 7/1962 | Hager | 340/347 |
| 3,360,635 | 12/1967 | Wolf | 250/569 |
| 3,432,676 | 3/1969 | Lindberg | 235/473 |
| 3,590,261 | 6/1971 | Snook | 250/231 |
| 3,742,233 | 6/1973 | Gorgens | 250/231 |
| 3,786,238 | 1/1974 | Heisner | 235/473 |
| 3,815,125 | 6/1974 | May et al. | 250/231 |
| 3,818,224 | 6/1974 | Schmidt | 250/231 |
| 3,831,024 | 8/1974 | Gill | 250/231 |
| 3,975,633 | 8/1976 | Larkin | 250/231 |
| 4,011,448 | 3/1977 | Hordeski | 250/237 |
| 4,110,611 | 8/1978 | Tann et al. | 250/231 |
| 4,143,267 | 3/1979 | Johnson et al. | 250/231 |

Primary Examiner—David C. Nelms
Assistant Examiner—Darwin R. Hostetter
Attorney, Agent, or Firm—John Swiatocha

[57] ABSTRACT

An improved optical transducer includes optical transmitter and receiver heads and an encoder plate movable therebetween on channel-shaped tracks integral in part with an inner housing. The encoder plate, and optical heads are disposed in an optical fluid which minimizes light refraction between those optical components, cushions against shock and vibratory loading, and lubricates the encoder plate tracks. The transducer includes an input shaft connected to the encoder plate by means of a coupling which isolates the encoder plate from misalignments of the input shaft and eliminates free-play in the connection between the encoder plate and input shaft, thereby eliminating backlash in the reciprocation of the encoder plate for improved transducer accuracy.

17 Claims, 4 Drawing Figures

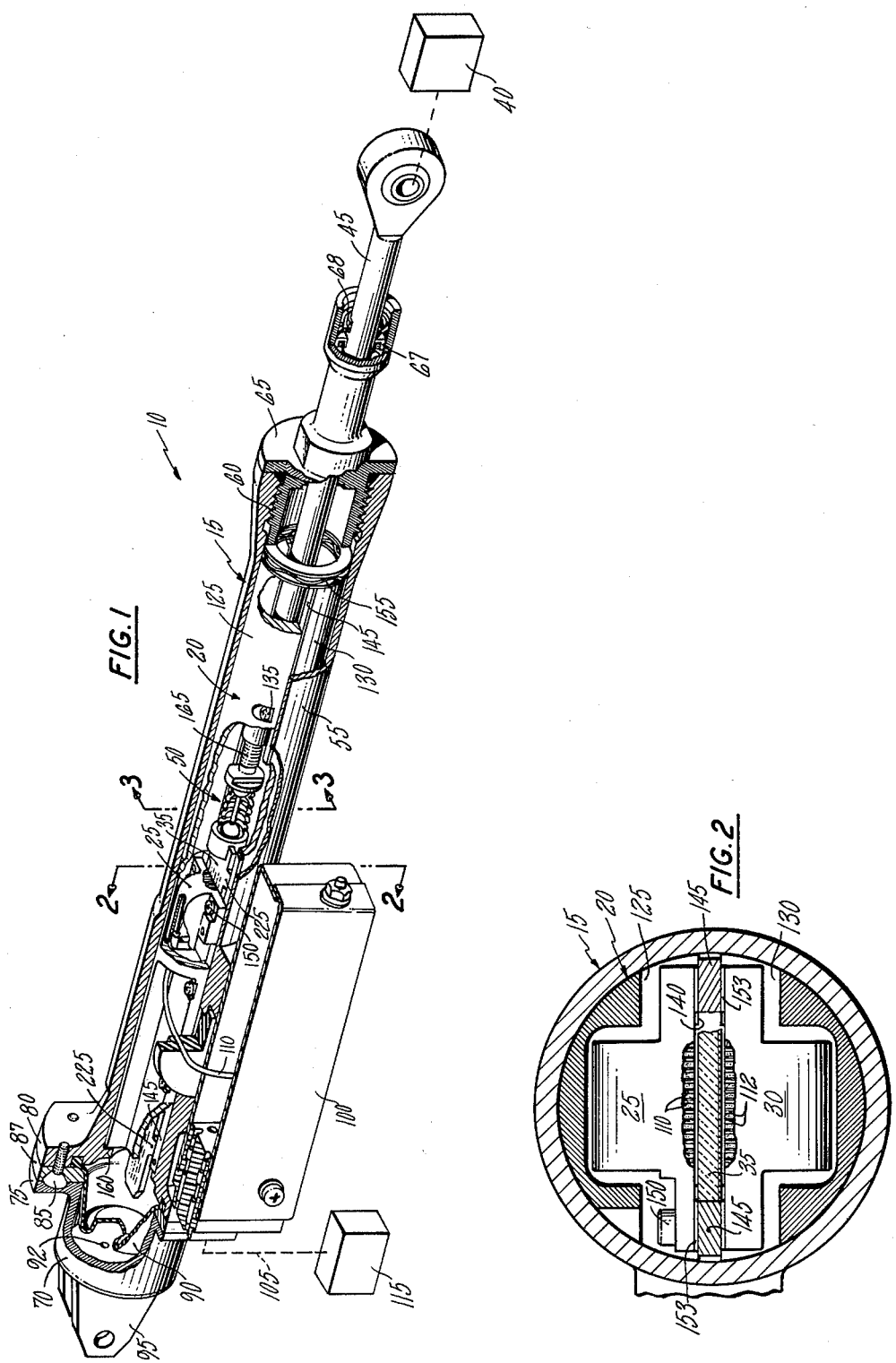

OPTICAL TRANSDUCER

DESCRIPTION

1. Technical Field

This invention relates to an optical transducer of the type comprising an optical transmitter, an optical receiver, and an encoder plate disposed therebetween for providing the receiver with an optical signal from light emitted by the transmitter, this signal being indicative of the position of the encoder plate with respect to the transmitter and receiver.

2. Background Art

Control systems for variably positioned apparatus such as aircraft control surfaces, variable pitch propellers, helicopter rotors, and the like generally employ transducers which provide the system with a signal indicative of the extent of actuation of the apparatus. In such a control system, the output signal from the transducer is fed to a signal processor which compares the transducer output with a reference signal indicative of desired actuation, and on the basis of that comparison, either calls for further actuation of the apparatus or signals that no further actuation is desired. Typically, such transducers have been electrical in nature and therefore, subject to electromagnetic interference which often causes spurious transducer output. Immunity to electromagnetic interference and potential for both compactness and high accuracy have in recent years, been responsible for continually increasing interest in optical position sensors or transducers. Such an optical transducer is described in U.S. Pat. No. 4,116,000 to Martin et al.

Optical transducers employed in the manner set forth hereinabove comprise basically the following components: an optical transmitter, an optical receiver, an encoder mask, structure required to support and protect the optical components, and apparatus which actuates and guides the encoder mask within the transducer. The transmitter generally functions as a constant source of light and is often provided in the form of a row of optical fiber ends, the optical fibers providing a transmission path for light from a remote source to the transmitter. The receiver typically comprises a row of optical fiber ends, these fibers providing a path for the transmission of light sensed by the receiver to the signal processor. The encoder plate generally comprises a mask, that is, a multiplicity of light transmissive areas in an opaque background. The mask is connected to the apparatus to be monitored or the actuator for that apparatus, movement of the encoder plate between the transmitter and receiver allowing light from only selected transmitter fibers to illuminate the receiver fibers, thereby establishing an optical signal to the receiver which is indicative of the position of the encoder and hence, the actuated device.

Typically, the transmissive portions of the encoder plate are arranged in a code such as a Gray code, the transmissive areas being disposed in a plurality of channels, each channel comprising a row having a multiplicity of spaced transmissive areas. As is well known, in such a Gray code, the spacing and width of the transmissive areas varies from row to row. To achieve compactness as well as high transducer resolution, that is, a high sensitivity to displacement of the encoder plate, it will be appreciated that certain of the transmissive areas must be extremely small, i.e. on the order of several ten-thousandths of an inch in width. For proper operation, each encoder plate channel must be properly aligned with the corresponding optical fibers in the transmitter and receiver. With such small light transmissive areas in the encoder plate, it will be appreciated that even slight misalignments of the encoder plate with respect to the transmitter or receiver could easily result in spurious transducer output signals. Such false signals could also result from vibration of the encoder plate and/or transmitter and receiver as well as from any backlash in the reciprocation of the encoder plate due to free-play in the mechanical connection of the encoder plate with the actuated device.

As shown in U.S. Pat. No. 4,011,448 to Hordeski, it is a prior art practice to mount the optical encoder plate to a follower or rod which is received within a track distinct from, and mounted within the encoder housing. As shown in U.S. Pat. No. 3,590,261 to Snook, it is another prior art practice to mount the encoder or shutter in keyways provided in a guide block disposed within the transducer housing. In each of these prior art techniques, misalignment of the optical components is risked by vibration or detachment of the guide block or track within the transducer housing. Accordingly, a method of mounting the transmitter, receiver and encoder plate within the transducer housing without risk of misalignment of these components due to vibration, misalignment, or detachment of associated mounting hardware is desired. However, the minuteness of the transmissive areas in the encoder plate requires that the transmitter and receiver be maintained in extremely close proximity to the encoder plate to minimize the risk of false signals due to refraction of light adjacent the major surfaces of the encoder plate. Moreover, the encoder plate being formed generally of a metal coated glass, is quite susceptible to damage from vibration, misalignment with the actuated device and the like, and therefore, must be mounted in a manner wherein the risks of such damage are minimized.

DISCLOSURE OF INVENTION

It is therefore, a principal object of the present invention to provide an improved optical transducer characterized by an enhanced maintenance of mutual alignment of the transmitter, receiver and encoder portions thereof.

It is another object of the present invention to provide such an optical transducer wherein the maintenance of such alignment is not at the expense of the disposition of the optical components thereof in close mutual proximity.

It is another object of the present invention to provide such an improved optical transducer wherein the risk of damage to the encoder plate thereof from vibration and/or misalignments thereof is minimized.

In accordance with the present invention, an encoder plate for an optical transducer is slideably disposed within channel-shaped tracks or guide slots at least in part integral with the transducer housing whereby any risk of misalignment of the tracks and an attendant misalignment of or damage to the encoder plate is minimized. The enhanced maintenance of the alignment of the encoder plate with the housing and tracks allows the optical transmitter and receiver to be disposed in extremely close proximity to the encoder, thereby reducing the risk of false signals due to refraction of light between the encoder and the transmitter and receiver. To minimize vibration of the optical components, the optical components are disposed in an optical fluid which lubricates the tracks, cushions the encoder plate from shock and damps plate vibration. The optical fluid approximates the refractive properties of the transmitter and receiver and the encoder plate, thereby reducing refraction between those components, thus minimizing the risk of false signals due to such refraction. Free-play in the connections between the encoder plate and the device being actuated is eliminated by a resilient coupling which in addition to such free-play elimination, maintains the alignment of the encoder plate with the guide rails slots, despite any misalignments of the encoder plate with the actuated device or the mechanical connections thereto.

BRIEF DESCRIPTION OF THE DRAWINGS

FIG. 1 is a perspective view of the transducer of the present invention, portions of the transducer being sectioned and broken away to show details of construction.

FIG. 2 is a sectional view taken in the direction of line 2—2 of FIG. 1.

BEST MODE FOR CARRYING OUT THE INVENTION

Figure 4:
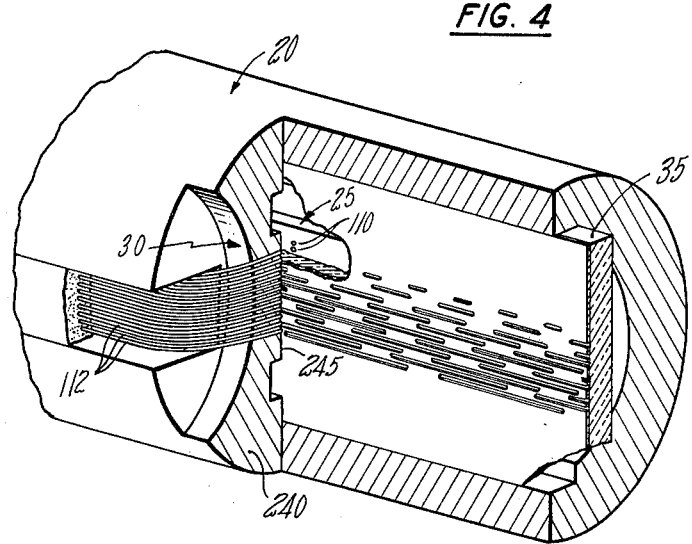
FIG. 4 is an enlarged, fragmentary, perspective view of an alternate embodiment of the present invention.

Referring to the drawings, the optical transducer of the present invention is shown generally at 10 comprising an outer housing 15 within which is disposed an inner housing 20 accommodating optical transmitter head 25, receiver head 30, and encoder plate 35 disposed therebetween. The encoder plate is coupled to an actuated device such as an aircraft control surface or the like, or the device's actuator shown schematically at 40 by means of input shaft 45 and resilient coupling 50. In operation, light from a suitable source (not shown) is applied to transmitter head 25 illuminating encoder plate 35, the transmissive portions of the encoder plate passing certain of the transmitted light to the receiver in the form of an optical signal indicative of the position of the encoder plate and hence, the extent of actuation of device 40.

Outer housing 15 comprises a major wall portion 55 having a threaded portion 60 which mates with threaded cap 65. Seals 67 and 68 are provided in cap 65 to prevent leakage of optical fluid between the housing and input shaft 45 and to wipe foreign matter from the shaft surface, respectively. The opposite end of outer housing 55 is closed by cap 70 having a flange 75 which is fastened to flange 80 on wall portion 55 as by bolts 85, thereby clamping spacer 87 and diaphragm or expandable wall portion 90 between flanges 75 and 80. Cap 70 is also provided with a vent 92 to relieve back pressure due to expansion of diaphragm 90. A clevis 95 may be provided integrally with cap 70 for the mounting of the transducer to a suitable stationary support (not shown). A secondary outer housing 100 encloses connections between optical conductors shown schematically at 105, transmitter optical fibers 110, and receiver optical fibers 112, the ends of which form optical transmitter and receiver 25 and 30. Optical conductors 105 connect the transducer to a remote light source and a signal processing means, both shown schematically at 115, the signal processing means controlling the actuation of device 40 on the bases of the output of transducer 10 and a reference signal indicative of a desired setting of device 40.

Figure 3:
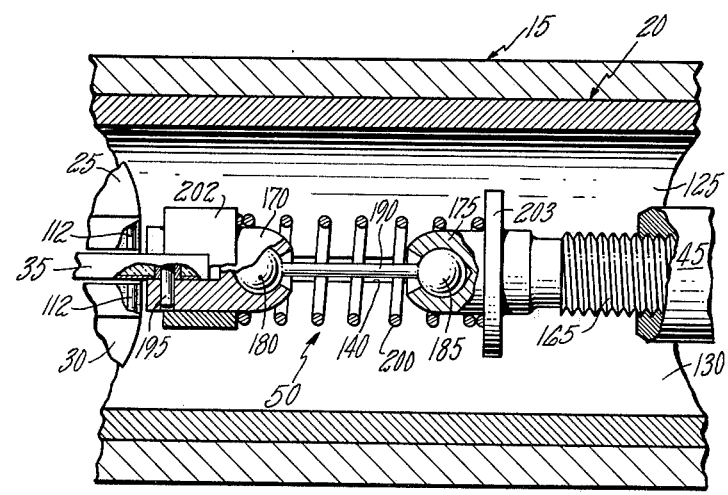
FIG. 3 is a sectional view taken in the direction of line 3—3 of FIG. 1.

Disposed within outer housing 55 is inner housing 20 comprising a pair of housing members 125 and 130 joined by such means as screws or similar fasteners 135. Referring to FIGS. 2 and 3 in the preferred embodiment, the housing members include edge portions defining in part, tracks 140 which support the encoder plate at the edges thereof for longitudinal, reciprocal movement within the inner housing. A guide rail 145 is disposed between outer portions of adjacent edge portions of the first and second housing members, the guide rails being clamped between the housing members by screws 135. As shown, the guide rails are of lesser width than the edge portions of the housing members and thereby, with those edge portion, lend a channel shape to the longitudinal tracks within which the edge portions of the encoder plate are received. The transmitter and receiver heads are attached at base portions thereof to the guide rails by screws 150, such that the encoder plate passes between these components as it reciprocates within the inner housing. The transmitter and receiver base portions are coated with a material such as a metal plating at 153 to provide clearance for the plate from the transmitter and receiver optical fiber ends. The guide rails are substantially the same thickness as the encoder plate whereby the gap between the encoder plate and the transmitter and receiver heads is minimized to minimize unwanted refraction of light in the gaps between the plate and the heads. In the preferred embodiment, the rails may be machined to a thickness approximately 0.001 in. (0.0025 cm) greater than the thickness of the encoder plate to further provide clearance for reciprocation of the encoder plate between the heads.

To effect the fixture of the assembled inner housing and guide rails within the outer housing, a resilient member such as wave washer 155 is disposed between an end of inner housing 20 and threaded cap 165, which, when threaded into the end of outer housing 20, seats the inner housing firmly against stop 160 at the opposite end of the outer housing, and compressing the wave washer. The resilience of the wave washer assures that the inner housing does not displace from its proper location as a result of vibration or shock loading which may be encountered by the transducer in an aircraft environment.

The outer housing contains an optical fluid to further reduce refraction in the gaps between the encoder plate and the transmitter and receiver heads. The fluid is preferentially also a lubricant to assure smooth traversal of the tracks by the encoder plate. Additionally, the fluid provides damping for protection of the optical components from vibratory and shock loading. In the preferred embodiment, the fluid comprises a silicon fluid such as Dow Corning 200 Silicone Fluid having an index of refraction of 1.399 which more closely approximates the indices of refraction of the encoder plate and optical fibers of the transmitter and receiver heads than would air. Diaphragm 90 accommodates displacement of the optical fluid by movement of input shaft 45 into the housing. As set forth hereinabove, vent 92 in cap 70 of the outer housing relieves back pressure on the diaphragm from the compression of air in the outer housing as the input shaft displaces the fluid. Seal 67, as described, prevents drainage of substantial amounts of the optical fluid from the outer housing while spreading a thin film of the fluid over the surface of the input shaft for the lubrication thereof.

Input shaft 45 comprises a rod internally threaded at the inner end portion thereof, the threads receiving an exteriorly threaded stud 165 either integral with or connected to coupling 50. The length of the input shaft is readily adjusted by turning the rod about its longitudinal axis, thereby either further threading the rod onto the stud or partially unthreading the rod from the stud.

Coupling 50 comprises first and second sockets 170 and 175 which receive therewithin, first and second rigidly connected ball members 180 and 185, respectively. The ball members are connected as by a link 190. Socket 170 is connected to the encoder plate by any suitable means such as a pin 195 while socket 175 is either connected to stud 165 as by welding, brazing, or the like, or is formed integrally therewith. It will be seen that the pivoting freedom between the balls and mating sockets accommodates any misalignment between input shaft 45 and encoder plate 35, thereby isolating such misalignment from the encoder plate. Accordingly, the risk of damage to the relatively brittle encoder plate due to such misalignment in normal operation of the transducer is minimized. The coupling is preferably also provided with resilient means biasing the encoder plate and input shaft apart, in the preferred embodiment, the resilient means comprising a compressed coil spring 200 disposed concentrically to and outwardly of the ball members. One end of spring 200 bears against collar portion 202 of socket 170, while the other end of the spring bears against collar portion 203 of socket 175. The spring, in biasing apart the input shaft and encoder plate, takes up any slack or free-play in the mechanical connections between those members, thereby eliminating any backlash in the reciprocal displacement of the encoder plate by the input shaft. The elimination of such backlash assures that any movement at all of input shaft 45 by the actuated device results in a corresponding equivalent displacement of the encoder plate for enhanced accuracy.

The encoder plate comprises any suitable optically transmissive material such as any well known optical glass, covered on one side thereof by a suitable masking material such as a thin layer of metal deposited on the glass by any suitable technique. In the preferred embodiment, the metal comprises either chromium or aluminum. The transmissive areas comprise openings in the mask at selected locations thereon, the precise location of the transmissive areas being established by any of various known photographic techniques.

As shown, substantial portions of the encoder plate edges are recessed whereby edge portions or followers 225 of the encoder plate received within tracks 140 are of very limited length for ease in controlling the width of the encoder plate in the manufacture thereof. Such precision in the control of the encoder plate width allows precise fitting of the plate between rails 145 to assure smooth traversal of tracks 140 by the encoder plate. Moreover, should irregularities in the track spacing or linearity exist, the limited length of edge portions 225 reduces the risk of plate jamming as a result of such irregularities.

It is noted then, that the optical transducer of the present invention having the tracks for the encoder plate provided in the inner housing, assures enhanced structural integrity of the tracks with an attendant compactness and minimization of encoder plate mounting hardware. The provision of rails 145 which function as encoder plate guides and mounts for the transmitter and receiver heads allows precision in the relative placement of the heads with respect to the encoder plate. The optical fluid, in approximating the indices of refraction of the encoder plate and the optical fibers of the transmitter and receiver heads, minimizes refraction of light between those optical components for enhanced transducer accuracy. The resilient coupling accommodates any misalignments between the input shaft and the encoder plate preventing damage to the plate from any such misalignments and further enhances the accuracy of the transducer by elimination of free-play in the mechanical connection of the input shaft to the plate.

Referring to FIG. 4, an alternate embodiment of the optical transducer of the present invention is shown, components in this embodiment which correspond to those of the hereinabove described embodiment being indicated by corresponding reference numerals. The transducer of this alternate embodiment is substantially the same as the transducer described hereinabove with the exception that in this embodiment, the transmitter and receiver heads are formed integrally with the inner housing, each inner housing member including one of the heads. As shown, each such head comprises a body portion 240 having an inner face 245 in parallel orientation with the major surfaces of the encoder plate. The body portion is drilled to provide a line of bores therethrough, each opening into the inner face and accommodating one of a plurality of optical fibers such as those described with references to FIGS. 1–3. Providing the transmitter and receiver heads integral with inner housing, allows the bores of both heads to be drilled simultaneously by known micro-drilling or laser-drilling techniques, thereby ensuring precise alignment of the optical fibers disposed in both heads. To further ensure such alignment, it may be desired to permanently fix the two inner housing portions together as by welding, brazing, or similar techniques. It may also be desired to form the encoder plate tracks entirely integrally with the inner housing members, thereby eliminating the requirement for fixture of the guide rails to the edge portions of the housing members prior to such welding or brazing.

While, for purposes of illustration, the invention has been shown in preferred embodiments thereof, it will be appreciated that alternate embodiments may suggest themselves to those skilled in the art by the hereinabove detailed description. For example, while the transducer has been shown having inner and outer housing members, it will be appreciated that proper sealing of the inner housing would eliminate the need for the outer housing. Furthermore, while specific fasteners and the like have been shown, alternate equivalent fasteners will readily suggest themselves to those skilled in the art. In addition, while a particular number and arrangement of transmissive areas on the encoder plate have been described, it will be readily apparent that the invention is not limited to such an arrangement.

We claim:

1. An optical transducer comprising an optical transmitter, an optical receiver and an encoder plate disposed therebetween, said encoder plate having light transmissive portions therein for establishing an optical signal from light provided by said transmitter and passing said signal to said receiver, said signal being indicative of the position of said encoder plate with respect to said transmitter and receiver, said optical transducer being characterized by a housing accommodating and providing a mount for said transmitter, receiver and encoder plate, said housing further accommodating an optical fluid having an index of refraction similar to those of said transmitter, receiver and light transmissive portions of said encoder plate, said optical fluid being flowable between said encoder plate and said transmitter and receiver for minimization of refraction of light transmitted to and from said encoder plate, for absorbing mechanical shock and vibration and for lubrication of movement of said encoder plate within said housing.

2. The optical transducer of claim 1 further characterized by said encoder plate being connected to and operated by an input shaft received partially within said housing and extending through one end thereof, said housing being provided with sealing means at said one end thereof adjacent said input shaft to prevent escape of said optical fluid from between said housing and input shaft.

3. The optical transducer of claim 1 further characterized by said optical fluid comprising a silicone fluid.

4. The optical transducer according to claim 1 further characterized by said housing defining a chamber having an expandable wall portion accommodating amounts of said optical fluid displaced as a result of the reception of said input shaft within said housing.

5. The optical transducer of claim 4 further characterized by said expandable wall portion comprising a diaphragm.

6. An optical transducer comprising an optical transmitter an optical receiver and an encoder plate disposed therebetween, said encoder plate establishing an optical signal from light provided by said transmitter, and passing said signal to said receiver, said signal being indicative of the position of said encoder plate with respect to said transmitter and receiver, said encoder plate being connected to, and operated by movement of an input member, said optical transducer being characterized by said connection of said encoder plate to said input member being made through a coupling accommodating rotation and pivoting of said input member for isolating said rotation and pivoting from said encoder plate.

7. The optical transducer of claim 6 further characterized by said coupling comprising a first socket fixed to said encoder plate, a second socket fixed to said input rod, and first and second rigidly connected ball members received within said sockets for joining said sockets together.

8. The optical transducer of claim 7 further characterized by said coupling including a resilient means biasing said encoder plate and input shaft apart for elimination of free-play in the connection of said encoder plate to said input shaft.

9. The optical transducer of claim 8 further characterized by said resilient means comprising a precompressed spring restrained between and bearing against said first socket and said input shaft.

10. The optical transducer of claim 9 further characterized by said precompressed spring comprising a coil spring disposed concentrically to and outwardly of said rigidly connected ball members.

11. An optical transducer comprising an optical transmitter, an optical receiver and an encoder plate disposed therebetween, said encoder plate establishing an optical signal from light provided by said transmitter, and passing said signal to said receiver, said signal being indicative of the position of said encoder plate with respect to said transmitter and receiver, said optical transducer being characterized by a housing receiving said encoder plate and said transmitter and receiver therewithin, said housing comprising a pair of opposed, interconnected housing members, each including a pair of parallel edge portions, said edge portions defining in part a track supporting said encoder plate for movement thereof within said housing parallel to said housing member edge portions.

12. The optical transducer of claim 11 further characterized by a pair of guide rails disposed between outer portions of said edge portions of said first and second housing members, said guide rails being of lesser width than said edge portions, whereby a pair of corresponding joined edge portions and the guide rail disposed therebetween define a channel shape in said track within which corresponding edges of said encoder plate are slideably received.

13. The optical transducer of claim 12 further characterized by said guide rails being of substantially the same thickness as said encoder plate.

14. The optical transducer of claim 12 further characterized by substantial portions of said encoder plate being recessed inwardly of said housing member edge portions whereby the edges of said encoder plate are received along only limited portions thereof within said channels.

15. The optical transducer of claim 12 further characterized by at least one of said transmitter and receiver comprising a plurality of optical fibers mounted in a head, said head including a base portion mounted on said guide rails.

16. The optical transducer of claim 15 further characterized by those portions of the transmitter and receiver head base portions adjacent said rails being provided with a coating which spaces the remainder of said base portions from said encoder plate thereby providing clearance for the reciprocation of said encoder plate between said transmitter and receiver heads.

17. The optical transducer of claim 11 further characterized by at least one of said transmitter and receiver comprising a plurality of optical fibers, said optical fibers being mounted in mating apertures provided in said housing members proximal to said encoder plate.

* * * * *